US006133822A

United States Patent [19]

Pfändler et al.

[11] Patent Number: 6,133,822

[45] Date of Patent: Oct. 17, 2000

[54] TRANSDUCER SUPPLY

[75] Inventors: Martin Pfändler, Maulburg; Bernd Strütt, Steinen, both of Germany

[73] Assignee: Endress + Hauser GmbH + Co., Germany

[21] Appl. No.: 09/217,241

[22] Filed: Dec. 21, 1998

[30] Foreign Application Priority Data

Dec. 30, 1997 [EP] European Pat. Off. .............. 97122991

[51] Int. Cl.[7] ...................................................... H04B 1/00

[52] U.S. Cl. ................................ 340/310.01; 340/310.02; 340/310.07; 340/538

[58] Field of Search ......................... 340/310.01, 310.02, 340/310.06, 310.07, 693.1, 538, 505, 10.1

[56] References Cited

U.S. PATENT DOCUMENTS

| | | | |
|---|---|---|---|
| 3,757,195 | 9/1973 | Sklaroof | 340/870.39 |
| 3,764,880 | 10/1973 | Rose | 363/22 |
| 4,292,633 | 9/1981 | Goodwin, Jr. et al. | 340/310.07 |
| 5,148,144 | 9/1992 | Sutterlin | 340/310.07 |
| 5,539,375 | 7/1996 | Atherton | 340/319.01 |
| 5,742,225 | 4/1998 | Wetzel et al. | 340/310.02 |

FOREIGN PATENT DOCUMENTS 31 39 963 6/1982 Germany .

OTHER PUBLICATIONS

Burkitt, C.J., "2–Wire Temperature Transmitters Offer DesignBenefits", Feb., 1972, *Control & Instrumentation*, pp. 34–35.

*Primary Examiner*—Donnie L. Crosland

*Attorney, Agent, or Firm*—Bose McKinney & Evans LLP

[57] ABSTRACT

The transducer supply is configured for supplying a passive transducer arranged in an explosion-hazard zone with electrical energy from a DC voltage source. The electrical energy is transmitted via a two-wire connection, via which in the opposite direction the measured value sensed by the transducer is transmitted by the transducer setting the direct current obtained from the DC voltage source to a value variable between two limit values. As a means of protection a transformer is inserted in the two-wire connection which affects DC decoupling. The direct current is chopped in accordance with the principle of a DC voltage converter at the primary side of the transformer and re-rectified on the secondary side. To permit connection of an active transducer instead of a passive transducer, the active transducer having its own energy supply and furnishing at its output connections a direct current in a quantity representing the measured value, an adapter circuit controlled by the output current of the active transducer is inserted between the output connections of the rectifier circuit and the connecting terminals provided for connecting the active transducer, this adapter circuit loading the rectifier circuit with a direct current which is proportional to the output current of the active transducer.

9 Claims, 3 Drawing Sheets

TRANSDUCER SUPPLY

BACKGROUND OF THE INVENTION

The invention relates to a transducer supply for supplying a transducer with electrical energy from a DC voltage source via a two-wire connection via which the measured value sensed by the transducer is transmitted by a direct current variable between two limit values, DC decoupling in the connection between the transducer and the DC voltage source being achieved by inserting a transformer, the primary winding of which is connected to the DC voltage source via a chopper and the secondary winding of which is connected to a rectifier circuit furnishing at its output connections a direct current generated by rectification of the chopped current transmitted via the transformer in a quantity as dictated by the transducer.

A transducer supply of this kind is intended to supply a passive transducer arranged in an explosion-hazard zone via a two-wire connection with electrical energy whilst simultaneously permitting transmission of the measurement signal furnished by the passive transducer in the opposite direction in the form of a current signal variable between two limit values. In accordance with a popular standard the current signal is variable between 4 mA and 20 mA. A passive transducer contains no electrical voltage source of its own, it instead obtaining the energy needed for its operation via the two-wire connection from a DC voltage source located remote therefrom, it forming the measurement signal by it obtaining from the DC voltage source, in addition to the supply current, a supplementary current dimensioned so that the total current obtained from the DC voltage source corresponds to the transmitted current signal in the range of the two alarm values of, for example, 4 to 20 mA. In addition, communication signals in the form of a pulsed variations may also be impressed on this current signal, as a result of which digital data may be transmitted in both directions. Since the total current may be transmitted in one direction only, namely from the voltage source to the transducer, providing a DC decoupling between the voltage source and the transducer through a transformer is possible by chopping the total current obtained from the DC voltage source at the primary side of the transformer according to the principle of a DC voltage converter and rectifying it at the secondary side of the transformer. Such a means of DC decoupling is a particularly advantageous means of protecting transducers located in an explosion-hazard zone. Providing DC decoupling by means of the transformer of a DC voltage converter permits transmission not only of the DC supply and the DC signal representing the measured value but also the bidirectional transmission of communication signals in the form of pulsed variations impressed on the total current on the condition that the chopper frequency is substantially higher than the frequency of the communication signals.

There is, however, the problem with a transducer supply of the aforementioned kind that it is not possible to connect instead of a passive transducer an active transducer. An active transducer is distinguished from a passive transducer by it being equipped with its own electrical energy supply and it generating the measurement signal in the form of DC signals varying between two alarm values from its own energy supply and outputting it at its outputs. It is not possible to transmit the DC signal furnished by the active transducer in the direction opposite the direction of transmittance of the DC voltage converter.

SUMMARY OF THE INVENTION

It is the object of the invention to provide a transducer supply of the aforementioned kind which whilst maintaining the protection afforded by the DC decoupling may be optionally operated with a passive transducer or an active transducer.

In accordance with the invention this object is achieved in that for connecting an active transducer, furnishing at its output connections a direct current in a quantity corresponding to the measured value, an adapter circuit controlled by the output current of the active transducer is inserted between the output connections of the rectifier circuit and the terminals of the transducer supply provided for connecting the transducer supply, this adapter circuit loading the rectifier circuit with a direct current which is proportional to the output current of the active transducer.

The transducer supply in accordance with the invention has the effect that the adapter circuit inserted between the active transducer and the rectifier circuit loads the DC voltage source arranged at the primary side via the rectifier circuit and the transformer in the same way as by a passive transducer with a direct current corresponding to the measurement signal to be transmitted. Accordingly, the primary side is unable to "see" whether an active or passive transducer is connected. The current obtained from the DC voltage source at the primary side via the rectifier circuit and the transformer also contains the supply current needed for operation of the adapter circuit. The total current may be impressed with communication signals in the form of pulsed variations in the same way as when loaded by a passive transducer, these pulsed variations being transmitted bidirectionally via the transformer. The means for protecting an explosion-hazard zone affected by the DC decoupling remain fully effective irrespective of whether an active or passive transducer is connected.

Advantageous aspects and further embodiments of the invention are characterized by the sub-claims.

BRIEF DESCRIPTION OF THE DRAWINGS

Further features and advantages of the invention read from the following description of an example embodiment with reference to the drawings in which.

DETAILED DESCRIPTION OF THE INVENTION

Figure 1:
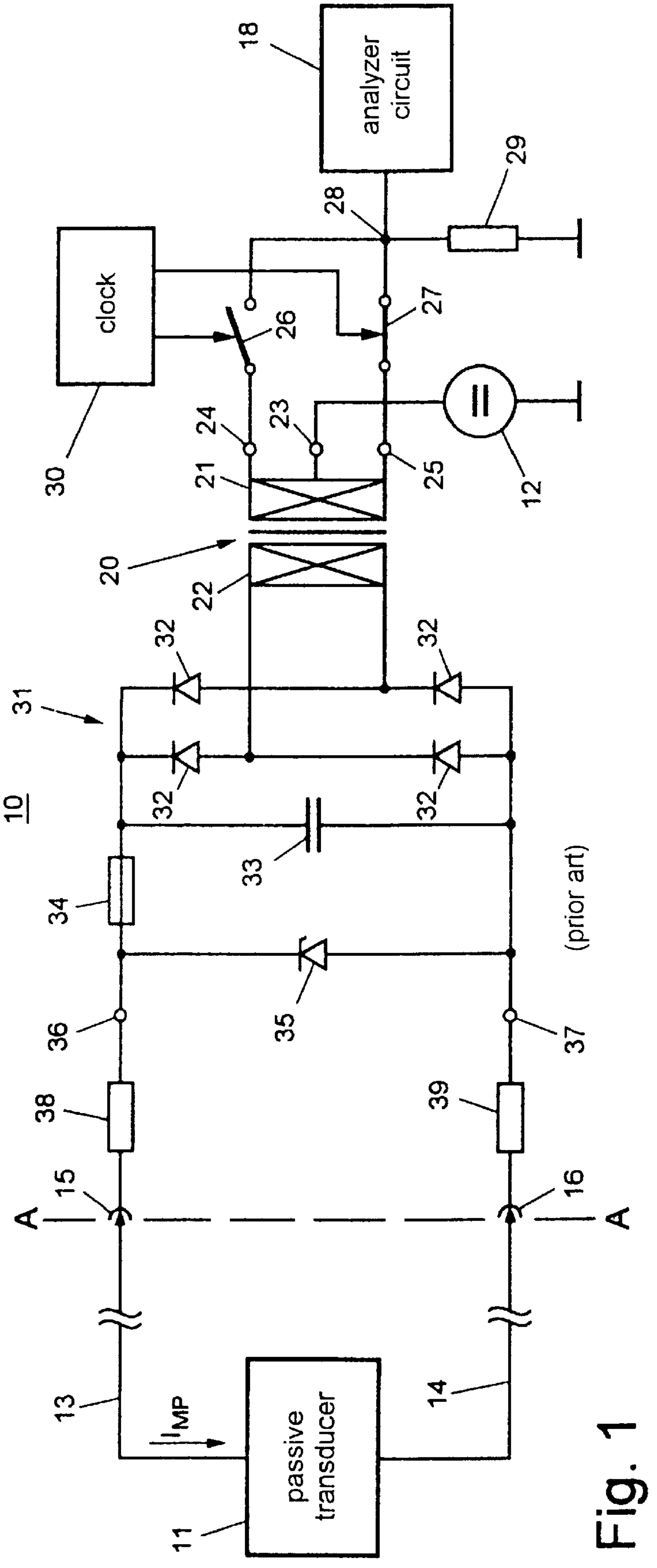
FIG. 1 is a circuit diagram of a transducer supply of a known kind for supplying a passive transducer with electrical energy and for transmitting the measurement signal via a two-wire connection.

Referring now to FIG. 1 there is illustrated a prior art transducer supply 10 formed by the circuit components depicted on the right of the broken line A—A for supplying a passive transducer 11 with electrical energy from a DC voltage source 12 via the two conductors 13, 14 of a two-wire connection via which in the opposite direction the measured value signal generated by the transducer 11 is transmitted. The two-wire connection 13, 14 is depicted discontinued to indicate that it may be of any length as required, it connecting the passive transducer 11 to the two terminals 15, 16 of the transducer supply 10.

The transducer 11 contains a sensor for the physical variable to be measured and an electronic circuit for converting the sensor signal into the measured value signal to be transmitted. A passive transducer contains no energy supply of its own, it instead obtaining the energy needed for operation of the electronic circuit via the two-wire connection 13, 14 from the DC voltage source 12 in the transducer supply 10 arranged remote therefrom. In accordance with a popular standard the transducer 11 forms the measured value signal by setting the current obtained from the DC voltage source 12 so that the measured value is expressed by a direct current in the range between 4 mA and 20 mA. The direct current is measured by an analyzer circuit 18 arranged at the location of the DC voltage source 12 and analyzed to detect the measured value of the physical variable sensed by the transducer 11. In addition the transducer 11 may be configured so that it impresses communication signals in the form of pulsed variations on the current signal to permit digital reading/writing of the measured values and parameters, this then making it necessary to transmit such communication signals bidirectionally between the transducer 11 and the analyzer circuit 18.

If the passive transducer 11 is located in an explosion-hazard zone, additional precautions must be taken for protection, one particularly effective means of protection for explosion-hazard zones being DC decoupling between the transducer 11, on the one hand, and the DC voltage source 12 and the analyzer circuit 18, on the other. The transducer supply 10 as shown in FIG. 1 is configured with such a DC decoupling.

In the case of the transducer supply 10 as shown in FIG. 1 DC decoupling is affected by a transformer 20 having a primary winding 21 and a secondary winding 22. The DC voltage source 12 is connected between a center tap 23 of the primary winding 21 and GND. Each of the two outer connections 24 and 25 of the primary winding 21 is connected to the one connection 28 of a resistor 29 via a switch 26 and 27 respectively, the other connection of which is connected to GND. The two switches 26 and 27 are clocked alternatingly by a clock 30 having a relatively high clock frequency of, for example, 200 kHz so that the switch 26 is open when the switch 27 is closed, and vice-versa. Accordingly, the current furnished by the DC voltage source 12 flows alternatingly clocked by actuation of the switch through the one or other half of the primary winding 21, but always in the same sense through the resistor 29. In the primary winding 21 the DC voltage is chopped into a square wave AC voltage which is transmitted into the secondary winding 22. Connected to the secondary winding 22 is a full-wave rectifier 31 incorporating four diodes 21 and a filter capacitor 33 generating the DC voltage for operating the passive transducer 11 by rectifying the square wave AC voltage. It will thus be appreciated that the transformer 20 in conjunction with the chopper formed by the switches 26, 27 and the clock 30 together with the rectifier circuit 31 form a DC voltage converter of a known kind. The switches 26, 27 represented simplified as mechanical switching contacts are, of course, in reality fast electronic switches, for example, field-effect transistors.

As a further means of protection for use of a passive transducer 11 in a explosion-hazard zone the rectifier circuit 31 contains a voltage limiter 35 in the form of a Zener diode connected via a fuse 34. Connected between the output connections 36, 37 of the rectifier circuit 31 and the terminals 15, 16 of the transducer supply for connecting the passive transducer 11 are protection resistors 38 and 39 respectively. The protection resistors 38, 39 prevent the current from increasing above a critical alarm value in the explosion-hazard zone and the voltage limiter 35 limits in conjunction with the fuse 35 the voltage in the explosion-hazard zone to a safe value.

The passive transducer 11 obtains from the rectifier circuit 31 a direct current $I_{MP}$, the value of which is set in the range 4 to 20 mA so that it represents the measured value of the physical variable sensed by the sensor. This direct current is furnished via the transformer 20 from the DC voltage source 12 so that in a 1 to 1 tranformation ratio of the transformer 20 a direct current the same in quantity flows via the resistor 29. The DC voltage drop across the resistor 29 is thus proportional to the measurement current $I_{MP}$ set by the passive transducer 11, this DC voltage being supplied to the analyzer circuit 18 connected to the connection 28.

When communication signals in the form of pulsed variations are impressed on the measurement current $I_{MP}$ by the passive transducer 11, these pulsed variations are likewise transmitted by the transformer 20 so that they appear as pulsed voltage variations in the voltage dropped across the resistor 29. These voltage variations are likewise detected and analyzed by the analyzer circuit 18. The repetition frequency of the pulsed variations is substantially lower than the clock frequency of the clock 30. The analyzer circuit 18 preferably contains at the input a low-pass filter, the cut-off frequency of which is set so that the clock frequency of the clock 30 is suppressed whilst the impressed pulsed communication signals are transmitted.

Figure 2:
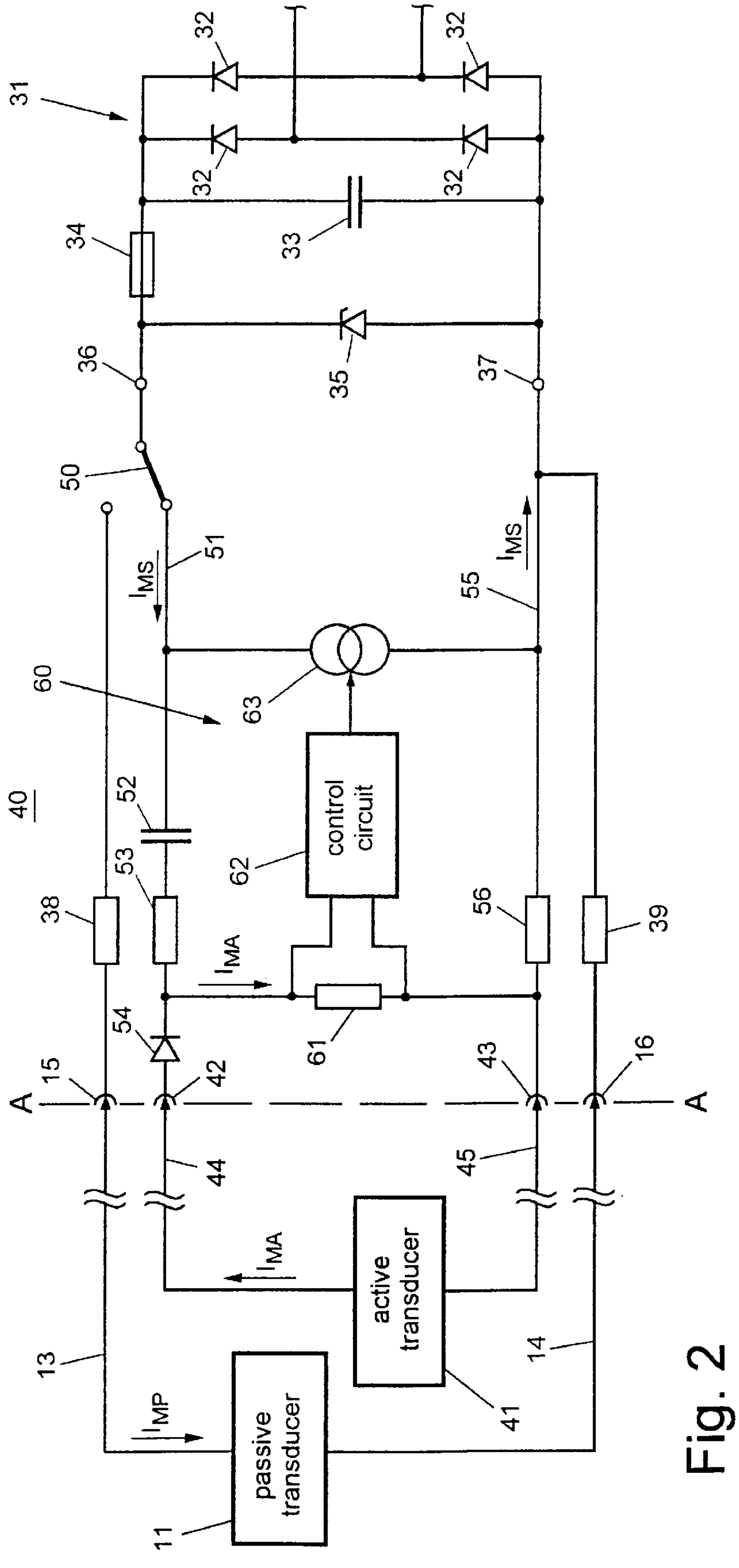
FIG. 2 illustrates the modification of the transducer supply as shown in FIG. 1 for optional connection of an active transducer instead of a passive transducer and FIG. 3 is the circuit diagram of one embodiment of the adapter circuit in conjunction with the transducer supply as shown in FIG. 2.

Referring now to FIG. 2 there is illustrated schematically the principle of a transducer supply 40 enabling instead of the passive transducer 11 optionally an active transducer 41 to be connected. Unlike the passive transducer an active transducer contains its own electrical voltage source and it outputs at the output a direct current furnished by this voltage source, the quantity of this direct current—again in the range 4 to 20 mA—corresponding to the measured value of the physical variable sensed by the sensor. It will readily be appreciated that it would not be possible to simply connect the active transducer 41 instead of the passive transducer 11 to the terminals 15, 16 of the circuit arrangement as shown in FIG. 1 since the direct current furnished by the active transducer 41 could not be transmitted via the rectifier circuit 31 and the transformer 20 to the primary side of the transformer 20. This is why the transducer supply 40 has two further terminals 42 and 43 to which the active transducer 41 is connected via the two conductors 44 and 45 of a two-wire connection.

To simplify the illustration in FIG. 2 only the circuit components of the transducer supply 40 located on the secondary side of the transformer 20 are shown; the circuit components located of the primary side being identical to those as shown in FIG. 1. Like circuit components in FIG. 1 and FIG. 2 are identified by like reference numerals, they also having the same function as has already been described in conjunction with FIG. 1. It will readily be appreciated that the circuit arrangement for the passive transducer 11 is the same as shown in FIG. 1, the only difference being that between the connection 36 of the rectifier circuit 31 and the protection resistor 38 a selector switch 50 is inserted. When the selector switch 50 is positioned so that it connects the rectifier circuit 31 via the protection resistor 38 to the connection 15, the circuit arrangement is identical to that as shown in FIG. 1.

When, however, the selector switch 50 is positioned as shown in FIG. 2 is connects the connection 36 of the rectifier circuit 31 via a connecting conductor 51, a decoupling capacitor 52, a protection resistor 53 and a diode 54 to the terminal 42. The connection 37 of the rectifier circuit 31 is permanently connected to the terminal 43 via a connecting conductor 55 and a protection resistor 56. As explained above, the active transducer 41 contains its own electrical voltage source and it outputs at the output a direct current $I_{MA}$, the quantity of which in the range 4 to 20 mA corresponds to the measured value of the physical variable sensed by the sensor. Inserted between the active transducer 41 and the rectifier circuit 31 is an adapter circuit 60 which obtains from the rectifier circuit 31 a direct current $I_{MS}$ equal or proportional to the direct current $I_{MA}$ furnished by the active transducer 41. The adapter circuit 60 contains a resistor 61 connected to the diode 54 at the terminals 42 and 43, a control circuit 62, the input connections of which are connected to the connections of the resistor 61, and a controllable current source 63 connected between the connecting conductors 51 and 52, the control input of the controllable current source being connected to the output of the control circuit 62. Accordingly, the controllable current source 63 bypasses the two output connections 36 and 37 of the rectifier circuit 31 when the selector switch 50 is positioned as shown in FIG. 2, corresponding to the connection of the active transducer 41, The control circuit 62 receives at the input a DC voltage corresponding to the drop in voltage across the resistor 61 caused by the current $I_{MA}$, it being configured so that its output signal sets the controllable current source 63 so that the current $I_{MS}$ taken from the rectifier circuit 31 is proportional to the current $I_{MA}$ furnished by the active transducer 41 with a predetermined constant factor, this factor preferably having the value 1 so that the current $I_{MS}$ equals the current $I_{MA}$. Accordingly, the current $I_{MS}$ taken from the rectifier circuit 31 produces the same effect as the current $I_{MP}$ dictated by the passive transducer 11 in the other position of the selector switch 50. This current $I_{MP}$ is reflected to the primary side of the transformer 20, resulting in a proportional drop in voltage across the resistor 29. This drop in voltage is thus proportional to the measurement current $I_{MA}$ furnished by the active transducer 41.

Figure 3:
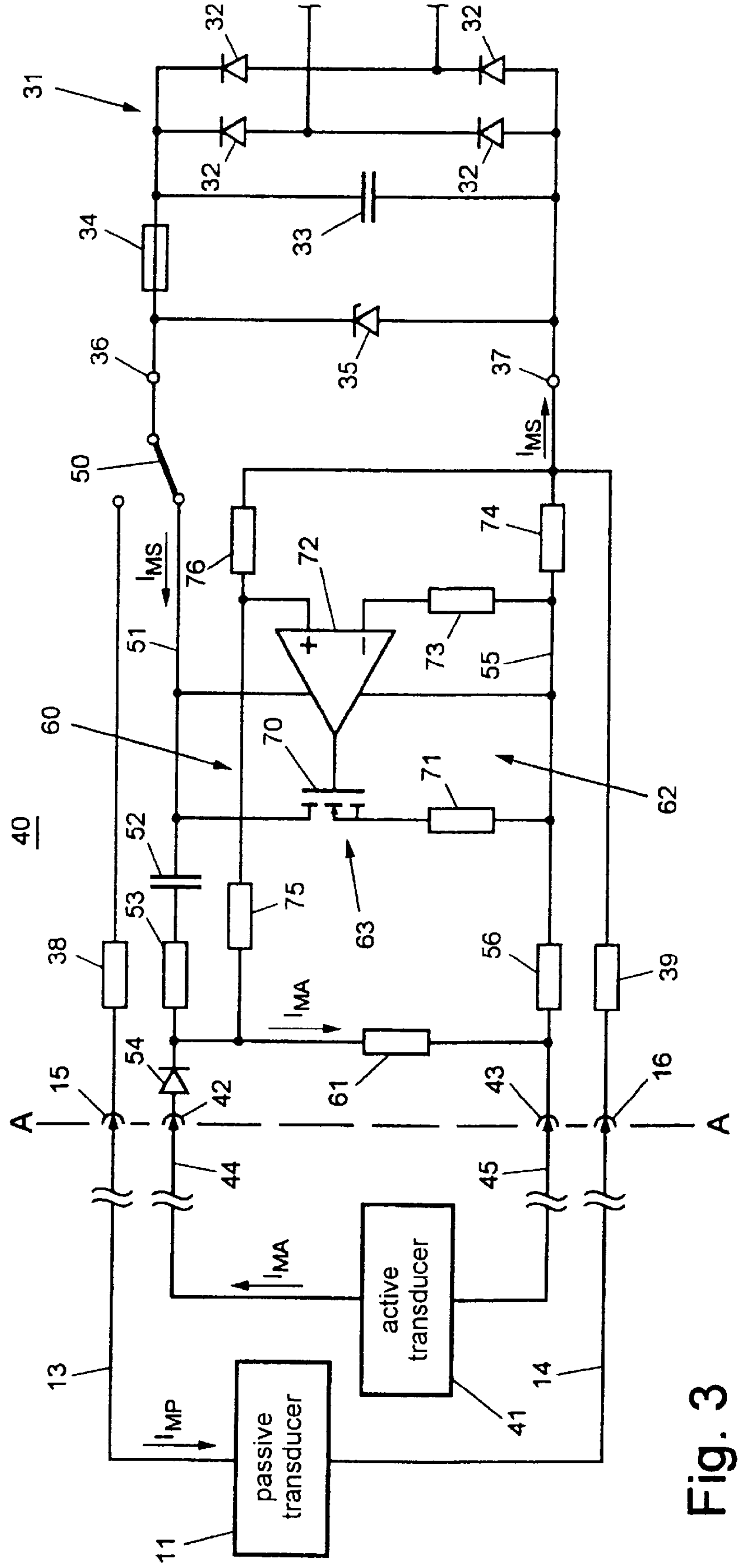

Referring now to FIG. 3 there is illustrated the circuit diagram of an embodiment of the controllable adapter circuit 60 as shown in FIG. 2, the circuit components of which corrresponding to those of FIG. 2 being identified by like reference numerals. The controllable current source 63 is formed by a field-effect transistor 70 connected in series with a resistor 71 between the connecting conductors 51 and 55. The control circuit 62 contains an operational amplifier 72, the current supply connections of which are connected to the connecting conductors 51 and 55 so that the operational amplifier 72 is supplied with current from the rectifier circuit 31 when the selector switch 50 is positioned corresponding to the connection of the active transducer 41. The inverting input of the operational amplifier 72 is connected to the connecting conductor 55 via a resistor 73. Inserted in the connecting conductor 55 between the connecting points of the current source 63, of the output 72 and of the resistor 73, on the one hand, and between the output connection 37 of the rectifier circuit 31, on the other, is a resistor 74 via which both the current dictated by the controllable current source 63 and the supply current of the operational amplifier 72 flow.

The non-inverting input of the operational amplifier 72 is connected to the voltage divider tap from two resistors 75 and 76 connected in series between the connection of the resistor 61 via the diode 54 to the terminal 42 and the connection 37 of the rectifier circuit 31. The output of the operational amplifier 72 is connected to the gate of the field-effect transistor 70.

When the resistance values of the resistors 61, 74, 75 and 76 are designated $R_{61}$, $R_{74}$, $R_{75}$ and $R_{76}$ respectively then the following relation exists between the current $I_{MA}$ flowing via the resistor 61 and the current $I_{MS}$ flowing via the resistor 74 to the input connection 37 of the rectifier circuit 31:

$$I_{MS} = I_{MA} \cdot \frac{R_{61} \cdot R_{76}}{R_{74} \cdot R_{75}}$$

Accordingly, the current $I_{MS}$ is proportional to the current $I_{MA}$ with a constant factor dictated by the resistors. This constant factor may be made equal to 1 by suitably dimensioning the resistors so that then the current $I_{MS}$ is equal to the current $I_{MA}$, this applying, for example, for the following resistance values:

$R_{61}$=250Ω

$R_{74}$=50Ω

$R_{75}$=100Ω

$R_{76}$=20Ω

From the FIGS. 2 and 3 it is further evident that in every position of the selector switch 50 the means of protection provided as regards the explosion-hazard zone, namely the DC decoupling by the transformer 20, the voltage limiting by the voltage limiter 35 and the fuse 34 and the current limiting by the protection resistors 38, 39 and by the protection resistors 53, 56 respectively, remain effective to their full extent. The decoupling capacitor 52 results in the active transducer being DC decoupled from the rectifier circuit 31 whilst permitting, however, the transmission of the impressed communication signals.

The diode 54 is poled so that it allows the current $I_{MA}$ furnished by the active transducer 41 to flow in the forward direction via the resistor 61, but blocking a flow of current from the transducer supply 40 to the active transducer 41. Due to the current and voltage limiting already contained in the circuit as shown in FIG. 1 sufficient safety for the transducer supply is provided when connecting a passive transducer since the energy existing maximally in a fault situation is too low to ignite a spark. When connecting an active transducer it could happen, however, that a current flowing from the transducer supply—which by itself would be too weak for igniting a spark—may be impressed on a current stemming from the active transducer outside of the transducer supply so that the sum of the two currents could be sufficient to ignite a spark. This risk is excluded, however, by the diode 54 since it prevents a current flowing from the transducer supply to the active transducer.

What is claimed is:

1. A transducer supply for connection to a passive transducer and an active transducer, said transducer supply supplying the passive transducer with electrical energy from a DC voltage source via a two-wire connection via which a measured value sensed by the passive transducer is transmitted by a direct current variable between two limit values, transducer supply terminals connecting the passive transducer to said transducer supply, a transformer having a primary winding and a secondary winding providing DC decoupling in the connection between the passive transducer and said DC voltage source, said primary winding being connected to said DC voltage source via a chopper and said secondary winding being connected to a rectifier circuit, said choppler producing a chopped current which is transmitted by said transformer, said rectifier circuit providing at its output terminals a direct current generated by rectification of said chopped current in a quantity dictated by the passive transducer, the active transducer providing at its output terminals a direct output current in a quantity corresponding to said measured value, an adapter circuit controlled by the direct output current of the active transducer being connected between said output terminals of said rectifier circuit and said transducer supply terminals, said adapter circuit loading said rectifier circuit with a direct current which is proportional to the direct output current of the active transducer.

2. The transducer supply as set forth in claim 1, wherein said adapter circuit loads said rectifier circuit with a direct current which equals said output current of said active transducer.

3. The transducer supply as set forth in claim 1, wherein said adapter circuit contains a controllable current source connected to the output terminals of said rectifier circuit and a control circuit which controls said controllable current source as a function of said output current of said active transducer for setting said direct current furnished by said rectifier circuit.

4. The transducer supply as set forth in claim 3, wherein said control circuit is formed by an operational amplifier.

5. The transducer supply as set forth in claim 1, wherein a selector switch for optionally connecting said rectifier circuit to a passive transducer or to said adapter circuit is connected to said output of said rectifier circuit.

6. The transducer supply as set forth in claim 2, wherein said adapter circuit contains a controllable current source connected to the output terminals of said rectifier circuit and a control circuit which controls said controllable current source as a function of said output current of said active transducer for setting said direct current furnished by said rectifier circuit.

7. The transducer supply as set forth in claim 2, wherein a selector switch for optionally connecting said rectifier circuit to a passive transducer or to said adapter circuit is connected to said output of said rectifier circuit.

8. The transducer supply as set forth in claim 3, wherein a selector switch for optionally connecting said rectifier circuit to a passive transducer or to said adapter circuit is connected to said output of said rectifier circuit.

9. The transducer supply as set forth in claim 4, wherein a selector switch for optionally connecting said rectifier circuit to a passive transducer or to said adapter circuit is connected to said output of said rectifier circuit.

* * * * *